April 16, 1946.  C. W. HOLMQUIST  2,398,529
METHOD OF MAKING BIMETALLIC INGOTS
Filed Aug. 15, 1944
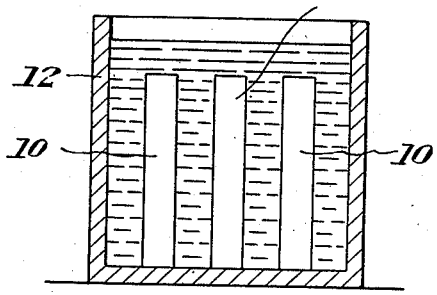
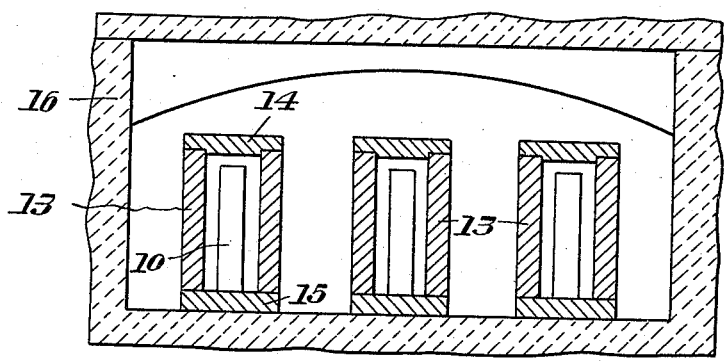
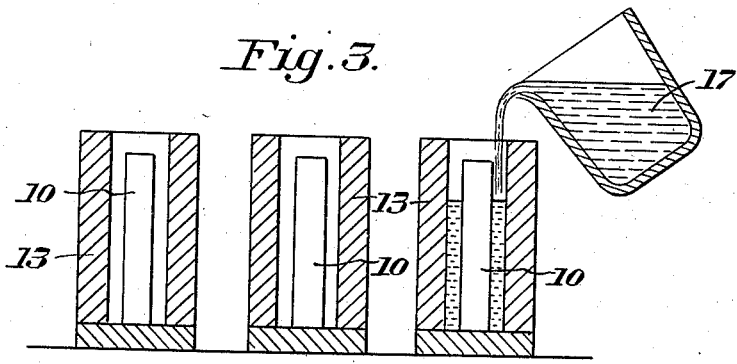
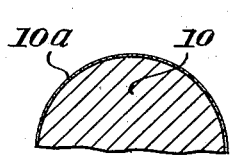
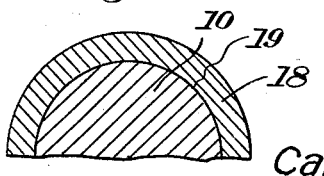
INVENTOR
Carl W. Holmquist
by his attorneys
Stebbins, Blenko & Webb Patented Apr. 16, 1946

2,398,529

UNITED STATES PATENT OFFICE 2,398,529

METHOD OF MAKING BIMETALLIC INGOTS

Carl W. Holmquist, Elizabeth, Pa., assignor to Copperweld Steel Company, Elizabeth, Pa., a corporation of Pennsylvania Application August 15, 1944, Serial No. 549,531

7 Claims. (Cl. 22—204)

This invention relates broadly to the manufacture of bimetallic material such as wire, rods, sheets, or the like having a core or base of one metal and an external layer or cladding of a different metal. In particular, the invention concerns the making of bimetallic ingots adapted to be worked down into the aforementioned products by known reduction operations such as drawing, rolling, etcetera.

Bimetallic ingots have usually been produced heretofore by placing a billet of the metal forming the core in a mold having sectional area greater than that of the billet, heating the mold and billet to a temperature approximating the melting point of the cladding metal, and then pouring molten cladding metal into the mold around the billet, thereby forming a composite ingot with an external cladding layer welded to the core. In practicing this process, it has been found that oxidation of the surface of the billet during heating introduces serious difficulties. The scale formed on the billet surface is very readily dissolved by the cladding metal producing a brittle alloy at the interface and impairing the purity of the cladding metal. The brittle interface layer is difficult to reduce, as by rolling, and a fracture therein leaves the cladding layer detached from the core. In the case of copper-clad steel-core wire intended for use as electrical conductors, the reduced purity of the cladding layer adversely affects the conductivity. Various expedients have been tried in an effort to prevent the oxidation of the billet during heating up, preparatory to pouring of the cladding layer. None of these expedients, however, has provided a complete solution of the problem, to my knowledge.

I have invented a novel method of making bimetallic ingots which reduces the oxidation or scaling of the billet forming the core to a negligible amount, thereby obviating the objectionable effects resulting therefrom. My invention has a further advantage in that it improves the bond between the base or core and the cladding layer. In a preferred practice of the invention, I give the billets adapted to form the core of bimetallic ingots a treatment in a solution of phosphoric acid and a metal salt, to produce a layer of a double phosphate thereon. This layer protects the surface of the billet from oxidation during heating. It also leaves a film of residual phosphorus on the surface at the time of pouring the cladding metal which improves the ability of the latter to wet the surface of the billet, thus producing a stronger bond at the weld or interface. Further details, novel features, and advantages of the invention will become apparent during the following detailed description and explanation which refer to the accompanying drawing illustrating diagrammatically the preferred practice. In the drawing, Figure 1 is a section through a tank holding a solution for treating billets of the metal forming the cores of the ingots, to produce a double phosphate layer thereon;

Figure 2 is a sectional view through a heating furnace illustrating the billets placed in molds for heating preparatory to pouring the cladding metal;

Figure 3 is a diagrammatic view showing the molds and a pouring ladle in section to represent the step of pouring the cladding layer into the molds around the cores or billets;

Figure 4 is a partial section through a billet after the formation of the double phosphate layer and before the application of the cladding layer; and Figure 5 is a partial section through a completed ingot.

Referring now in detail to the drawing and considering the invention as applied by way of example, to the production of bimetallic ingots including a steel core and a copper cladding layer, steel billets 10 of appropriate dimensions are immersed in a treating solution 11 contained in a suitable tank 12. The solution 11 is composed of phosphoric acid of a concentration from molar to twice molar. The solution also includes a metal salt adapted to form with the iron of the billets, a surface layer of a double phosphate such as manganese-iron phosphate or a zinc-iron phosphate, for example. Any suitable salt of manganese or zinc may be added to the solution in such quantity as to produce a layer of double phosphate as aforesaid.

The solution 11 is preferably heated to a temperature of about 200° F., by any convenient means, and the billets are left therein for about an hour or until a layer of double phosphate about .0002" thick is formed thereon. The billets are then removed from the solution and given a water rinse. Figure 4 illustrates a billet 10 having a layer of double phosphate 10a thereon, thus representing the condition of the billets when removed from the tank 12.

The billets thus coated are then placed in suitable ingot molds 13 having removable covers or tops 14 and stools 15. The molds are placed in a heating furnace 16 and then brought up to a temperature approximating the melting point of the cladding metal. In the specific example here under consideration, i. e., a steel core with a cladding layer of copper thereon, the mold and billet or core are heated to a temperature of about 1800° F.

When the billets and molds have been heated to the proper temperature, they are removed from the furnace 16. The covers 14 are removed from the molds and molten cladding metal is poured into the molds as by a ladle 17. The cladding metal layer is thus welded to the core forming an integral bimetallic mass when the cladding metal solidifies. Figure 5 illustrates the finished ingot composed of the billet or core 10 and a layer 18 of cladding metal with a weld or interface 19 therebetween.

The double phosphate layer formed on the billets 10 effectively prevents oxidation thereof while being heated in the furnace 16. The billets are thus substantially scale free when the cladding metal is poured around them. As a result, the cladding metal is firmly welded to the billets without any oxide therebetween. This eliminates the formation of the aforementioned brittle iron alloy at the interface. It also limits the amount of iron from the billets which is dissolved by the copper cladding layer. The difficulty in rolling resulting from the brittle interface layer is thus avoided as well as the reduction in the conductivity of the cladding layer which would otherwise result from the solution of the iron in the copper.

In addition to the foregoing benefits, the residual phosphorus from the layer of double phosphate combines with any oxygen in the molten copper and results in a film of metal on the surfaces of the billets having special wetting characteristics in respect to the cladding layer. This greatly improves the character of the weld between the cladding and core.

It will be apparent from the foregoing that the invention largely overcomes the difficulties encountered heretofore in making bimetallic ingots, which resulted from the oxidation of the billets while being heated preparatory to the pouring of the cladding metal. The preliminary treatment contemplated by the invention is simple and inexpensive, in addition to being highly effective as above described.

Although I have disclosed only a preferred practice of the invention, it will be understood that changes in the procedure described may be made without departing from the spirit of the invention or the scope of the appended claims.

I claim:

1. In a method of making a bimetallic ingot having a core of one metal and a cladding layer of another metal, the steps including forming a layer of a double metal phosphate on the surface of the core, placing the core in a closed container, heating the core while in said container to a temperature near the melting point of the cladding metal, and pouring molten cladding metal around the core.

2. In a method of making a bimetallic ingot having a core of one metal and a cladding layer of another metal, the steps including forming a layer of a double metal phosphate on the surface of the core, placing the core in a closed container heating the core while in said container to a temperature near the melting point of the cladding metal, and pouring molten cladding metal around the core.

3. In a method of making a bimetallic ingot by pouring molten cladding metal around a core of base metal heated substantially to the melting point of the cladding metal, to weld it thereto, the steps of immersing the core in a solution effective to form thereon a layer of a double metal phosphate, and heating the core so coated nearly to the melting point of the cladding metal before pouring the latter.

4. In a method of making a bimetallic ingot by pouring molten cladding metal around a core of base metal heated substantially to the melting point of the cladding metal, to weld it thereto, the steps of immersing the core in a solution effective to form thereon a layer of a salt which on being heated to a temperature in the neighborhood of the melting point of the cladding metal leaves a residual phosphorus layer on the core, and heating the core so coated to such temperature before pouring the cladding metal.

5. In a method of making a bimetallic ingot by pouring molten cladding metal around a core of base metal heated substantially to the melting point of the cladding metal, to weld it thereto, the step of reducing the amount of the base metal dissolved in the cladding metal by forming on the core a film of a double metal phosphate resistant to oxidation of the core, before pouring the cladding metal.

6. In a method of making a bimetallic ingot having a core of one metal and a cladding layer of another metal, the steps including immersing the core in a solution of phosphoric acid and a salt of a metal other than that of which the core is composed, thereby forming a layer of a double phosphate on the core, heating the core to a temperature in the neighborhood of the melting point of the cladding metal and pouring the latter around the core.

7. In a method of making a bimetallic ingot having a core of one metal and a cladding layer of another metal, the steps including immersing the core in a solution of phosphoric acid and a metallic salt until a layer of double phosphate at least .0002" thick has been formed thereon, heating the core to a temperature in the neighborhood of the melting point of the cladding metal and pouring the latter around the core.

CARL W. HOLMQUIST.